(12) United States Patent
Nakayoshi

(10) Patent No.: US 10,827,091 B2
(45) Date of Patent: Nov. 3, 2020

(54) IMAGE READING APPARATUS

(71) Applicant: CANON KABUSHIKI KAISHA, Tokyo (JP)

(72) Inventor: Asahiro Nakayoshi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/288,688

(22) Filed: Feb. 28, 2019

(65) Prior Publication Data

US 2019/0289164 A1 Sep. 19, 2019

(30) Foreign Application Priority Data

Mar. 15, 2018 (JP) ................................ 2018-048051

(51) Int. Cl.
*H04N 1/32* (2006.01)
*B41J 29/38* (2006.01)
*H04N 1/00* (2006.01)

(52) U.S. Cl.
CPC ............ *H04N 1/3263* (2013.01); *B41J 29/38* (2013.01); *H04N 1/00018* (2013.01)

(58) Field of Classification Search
CPC .......... H04N 1/00002; H04N 1/00007; H04N 1/00018; H04N 1/3263; H04N 1/32625
See application file for complete search history.

(56) References Cited

U.S. PATENT DOCUMENTS

| 10,038,801 B2 | 7/2018 | Nakayoshi et al. ........................ H04N 1/00801 |
| 10,110,776 B2 | 10/2018 | Sunada et al. ..... H04N 1/00588 |
| 2005/0050423 A1 | 3/2005 | Yasukawa et al. ........... 714/742 |

FOREIGN PATENT DOCUMENTS

| JP | 2005-033559 | 2/2005 |
| JP | 2006128969 A | * 5/2006 |

OTHER PUBLICATIONS

Noda et al., JP 2006-128969 A, May 2006, JPO Computer Translation (Year: 2006).*
U.S. Appl. No. 16/254,481, filed Jan. 22, 2019.
U.S. Appl. No. 16/217,823, filed Dec. 12, 2018.

* cited by examiner

*Primary Examiner* — Erika J Villaluna
(74) *Attorney, Agent, or Firm* — Venable LLP

(57) ABSTRACT

An image reading apparatus, including: an image reading unit configured to read an image of an original; an image reading controller configured to control the image reading unit; a signal transmission cable configured to connect the image reading unit and the image reading controller; a drive portion configured to move the image reading unit; and an image signal generation portion, provided in the image reading unit, configured to generate an image signal based on a predetermined pattern, wherein the image reading controller is configured to obtain, through the signal transmission cable, the image signal output from the image signal generation portion while causing the drive portion to move the image reading unit to change a bending state of the signal transmission cable, and to detect whether there is an abnormality in the signal transmission cable based on a pattern of the image signal obtained by the image reading controller.

17 Claims, 15 Drawing Sheets

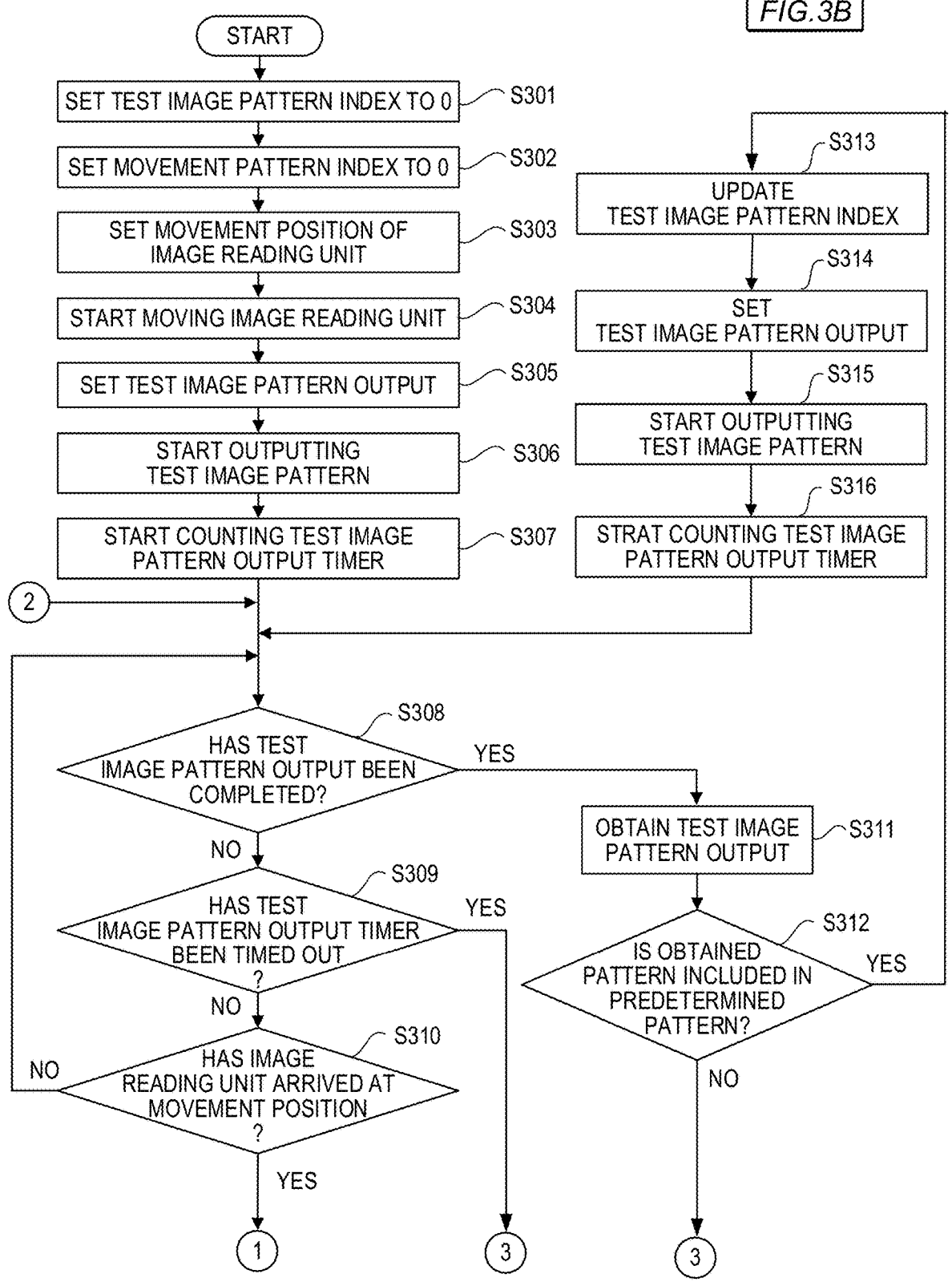

IMAGE READING APPARATUS

BACKGROUND OF THE INVENTION

Field of the Invention

The present invention relates to an image reading apparatus including a signal transmission cable.

Description of the Related Art

In recent years, great importance has been placed on an increase in labor productivity. It is required not only at production sites of factories but also in offices to automate what can be automated by machines, and to provide an environment that enables workers to work creatively and productively. In the multifunction peripheral market, it is common to efficiently manage and operate a large number of devices installed at a plurality of base locations, to thereby maintain a highly reliable state and improve productivity. Technical direction for improving the reliability involves extending a mean time between failures (MTBF) and shortening a mean time to repair (MTTR). As a method for extending the MTBF, it is conceivable to employ a method of multiplexing or making redundant a system so as to prevent an occurrence of a failure and to be able to continue to operate even when a failure occurs. However, in general, an increase in cost of parts tends to lead to an increase in product prices.

Meanwhile, as a method for shortening the MTTR, it is proposed to employ a failure diagnosis apparatus configured to quickly identify a spot at which a failure has occurred based on a phenomenon occurring at a time of the failure (Japanese Patent Application Laid-Open No. 2005-33559). According to Japanese Patent Application Laid-Open No. 2005-33559, a feature amount is referred to as a determination criterion to diagnose a drive member in terms of presence or absence of a failure and a state of the failure, or diagnose another power transmission member in terms of presence or absence of a failure and details of the failure, based on a degree to which the feature amount deviates from a normal range.

However, in Japanese Patent Application Laid-Open No. 2005-33559, it is impossible to identify an abnormality when the failure has not occurred in the power transmission member, that is, when the feature amount regarding an increase in load does not change. In a copying machine or other such image reading apparatus, a scanning operation for obtaining image data by optically reading an image from an original placed on original table glass is generally performed. A related-art configuration in which a signal transmission cable configured to transmit an image signal is bent during the scanning operation has a problem of being unable to accurately detect a contact failure of the signal transmission cable. When a communication abnormality is caused by a contact failure of the signal transmission cable, it is difficult for the image reading apparatus itself to determine whether or not there is an abnormality in a communication source board, whether or not there is an abnormality in the signal transmission cable, or whether or not there is an abnormality in a communication destination board. Up to now, a service engineer is required to visit the site to examine continuity of each of parts of the image reading apparatus through use of, for example, a tester. However, in order to reduce maintenance costs involved in maintenance and management of the multifunction peripheral, it is required to improve a self-diagnostic capability to identify a failure location from a remote site, and hence there is a challenge to improve a remote diagnostic capability.

Meanwhile, the communication source board and the communication destination board are inspected at a factory before shipping, and hence it is unlikely that a connector is suddenly pulled out of the communication source board or the communication destination board after shipment to disable communication. In contrast, a flexible flat cable to be used as a signal transmission cable physically changes its bending state, and may therefore be disconnected due to metal fatigue, stress, or other such factor. In addition, a broken point of the signal transmission cable may be brought to a state of being disconnected when the signal transmission cable is bent, and may be conductive when the signal transmission cable is held straight. That is, it may not be possible to examine whether or not a disconnection has occurred in the signal transmission cable unless the signal transmission cable is moved to change the state of the signal transmission cable between a bending state and a straight state by moving the signal transmission cable. Therefore, it is required to inspect the continuity while changing the bending state of the signal transmission cable. Further, when an abnormality of the signal transmission cable is to be determined based on an image signal received through the signal transmission cable, the image signal output during image reading varies, and hence there is no reference for determining whether or not the received image signal is correct.

SUMMARY OF THE INVENTION

In order to solve the above-mentioned problems, according to an embodiment of the present invention, an image reading apparatus, comprises:

an image reading unit configured to read an image of an original;

an image reading controller configured to control the image reading unit;

a signal transmission cable configured to connect the image reading unit and the image reading controller;

a drive portion configured to move the image reading unit; and an image signal generation portion, which is provided in the image reading unit, configured to generate an image signal based on a predetermined pattern, wherein the image reading controller is configured to obtain, through the signal transmission cable, the image signal output from the image signal generation portion while causing the drive portion to move the image reading unit to change a bending state of the signal transmission cable, and to detect whether there is an abnormality in the signal transmission cable based on an obtained pattern of the image signal obtained by the image reading controller.

Further features of the present invention will become apparent from the following description of exemplary embodiments with reference to the attached drawings.

BRIEF DESCRIPTION OF THE DRAWINGS

FIG. 3 which is composed of FIG. 3A

DESCRIPTION OF THE EMBODIMENTS

Now, the embodiments will be described with reference to the accompanying drawings.

First Embodiment

<Image Reading Apparatus>

Figure 1:
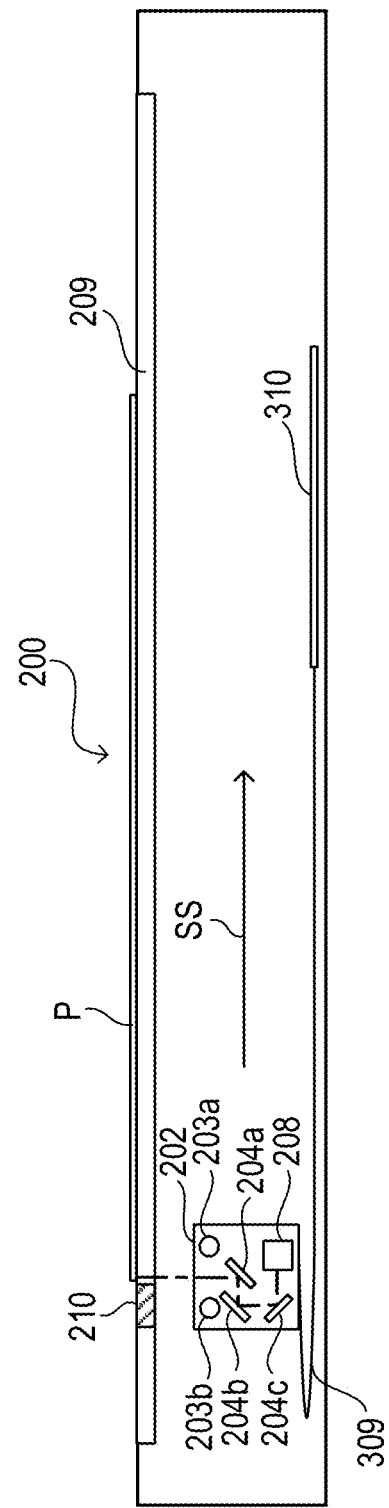
FIG. 1 is a sectional view of an image reading apparatus according to a first embodiment of the present invention.

Now, with reference to the accompanying drawings, an image reading apparatus 200 according to a first embodiment of the present invention is described as an example of an image reading apparatus. FIG. 1 is a sectional view of the image reading apparatus 200 according to the first embodiment. The image reading apparatus 200 includes an optical scanner unit (hereinafter referred to as "image reading unit") 202, an original reading controller (hereinafter referred to as "image reading controller") 310, and a flexible flat cable (hereinafter referred to as "signal transmission cable") 309. The image reading unit 202 reads an image of an original. The image reading controller 310 controls the image reading unit 202. The signal transmission cable 309 electrically connects the image reading unit 202 and the image reading controller 310.

Figure 2:
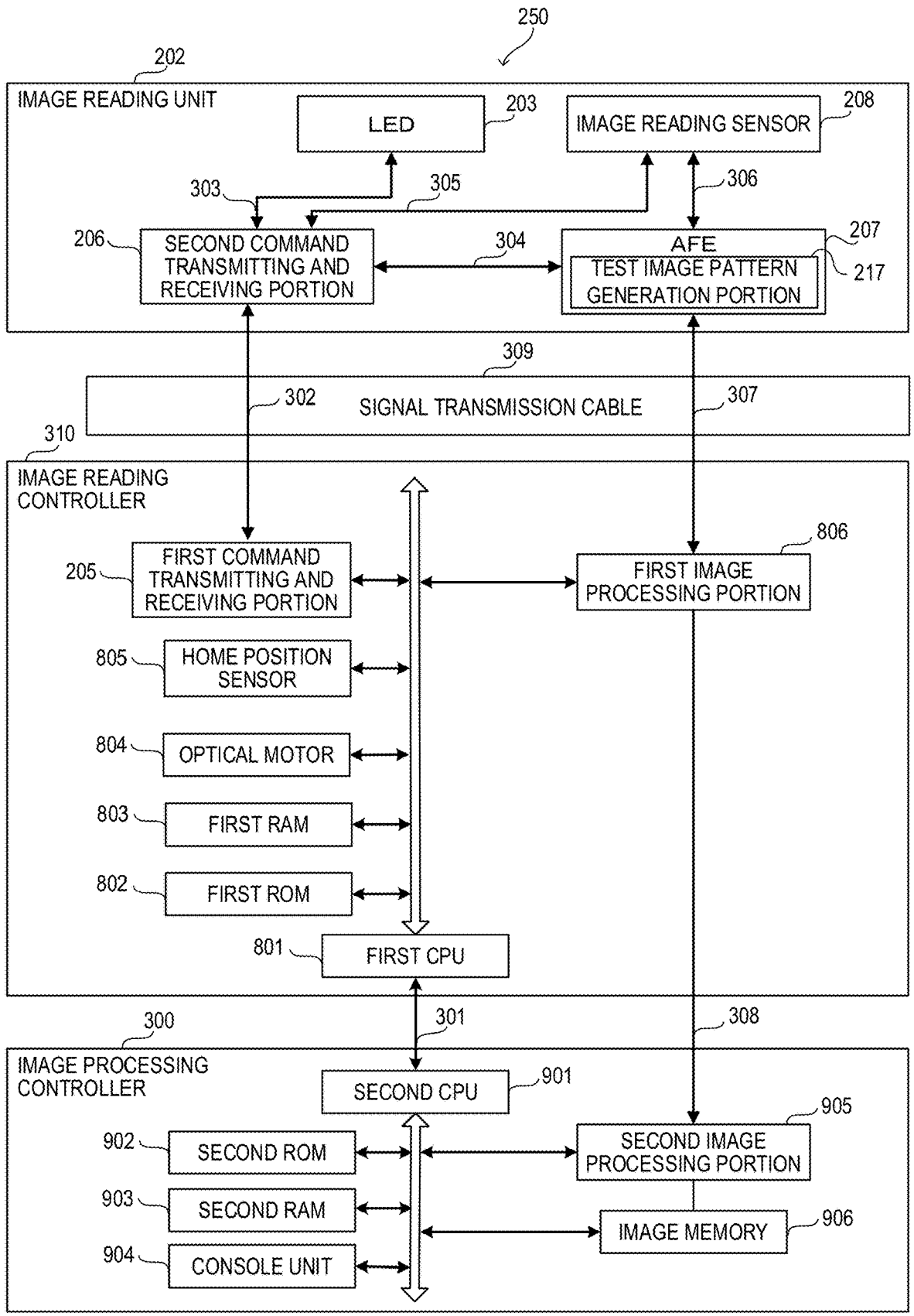
FIG. 2 is a block diagram of a control system of the image reading apparatus according to the first embodiment.

The image reading unit 202 includes light emitting elements (hereinafter referred to as "LEDs") 203a and 203b serving as light sources, reflecting mirrors 204a, 204b, and 204c, and an image reading sensor 208. The LED 203a and the LED 203b irradiate an original P placed on original table glass 209 with illumination light. Reflected light from the original P is reflected by the reflecting mirrors 204a, 204b, and 204c to enter the image reading sensor 208. The image reading sensor 208 receives the reflected light from the original P, which has been illuminated with the light emitted from the LED 203a and the LED 203b, and generates an analog image signal. The image reading controller 310 includes an optical motor 804, which is illustrated in FIG. 2, as a drive portion configured to move the image reading unit 202 in a sub-scanning direction SS. The image reading unit 202 is a line image sensor configured to read an image along a line in a main scanning direction perpendicular to the sub-scanning direction SS to output image data. While the image reading unit 202 is being moved at a constant speed in the sub-scanning direction SS by the optical motor 804, the image reading sensor 208 reads the image of the original P placed on the original table glass 209 line by line to output two-dimensional image data. Before starting reading the image of the original, the image reading unit 202 is moved to a position under a shading white plate 210, which serves as a white reference member, in order to read the shading white plate 210. A first image processing portion 806 illustrated in FIG. 2, which is described later, executes shading control based on a reading result obtained by the shading white plate 210, to thereby suppress variations in brightness of each pixel of the image reading unit 202. The image reading sensor 208 may be formed of a CMOS or a CIS.

<Control System>

FIG. 2 is a block diagram of a control system 250 of the image reading apparatus 200 according to the first embodiment. The control system 250 includes the image reading unit 202, the image reading controller 310, an image processing controller 300, and the signal transmission cable 309 configured to electrically connect the image reading unit 202 and the image reading controller 310. The image reading controller 310 includes a first CPU 801 being a central processing unit, a first ROM 802 being a read-only memory, and a first RAM 803 being a random-access memory. The first ROM 802 stores a control program. The first RAM 803 stores input data and work data.

The image reading controller 310 further includes the optical motor 804, a home position sensor 805, the first image processing portion 806, and a first command transmitting and receiving portion 205. The first CPU 801 controls the optical motor 804 to cause the image reading unit 202 to reciprocate in the sub-scanning direction SS of FIG. 1. The home position sensor 805 outputs a home position signal, which indicates that the image reading unit 202 is located at a home position in the sub-scanning direction SS, to the first CPU 801. The home position signal is used for accurately detecting an image leading end position at a time of image reading and a shading white plate position at a time of shading control. The first command transmitting and receiving portion 205 is connected to a second command transmitting and receiving portion 206 mounted to the image reading unit 202 through an image reading command communication portion 302. The first command transmitting and receiving portion 205 transmits a command to the second command transmitting and receiving portion 206 by general serial communication (UART or SPI).

The image reading unit 202 includes the LEDs 203, the image reading sensor 208, the second command transmitting and receiving portion 206, and an analog front end (AFE) 207. The second command transmitting and receiving portion 206 is electrically connected to the LEDs 203 through an LED control communication portion 303. In accordance with the command received from the first command transmitting and receiving portion 205, the second command transmitting and receiving portion 206 controls turning on or off of each of the LEDs 203 and sets a light amount of each of the LEDs 203 through the LED control communication portion 303.

The second command transmitting and receiving portion 206 is electrically connected to the image reading sensor 208 through an image control communication portion 305. In accordance with the command received from the first command transmitting and receiving portion 205, the second command transmitting and receiving portion 206 sets a parameter, for example, a gain for amplifying the analog signal, for the image reading sensor 208 through the image control communication portion 305. The second command transmitting and receiving portion 206 is electrically connected to the AFE 207 through an AFE control communication portion 304. In accordance with the command received from the first command transmitting and receiving portion 205, the second command transmitting and receiving portion 206 sets a parameter, for example, a cycle period of a horizontal sync signal Hsync to be transmitted to the image reading sensor 208 by the AFE 207.

The AFE 207 is electrically connected to the image reading sensor 208 through a first image communication portion 306. When the image of the original is read, the AFE 207 transmits the horizontal sync signal Hsync to the image reading sensor 208 through the first image communication portion 306, and receives the analog image signal from the image reading sensor 208 through the first image communication portion 306. The AFE 207 is an analog-to-digital converter (A/D converter) configured to convert the analog image signal into a digital image signal. The AFE 207 is electrically connected to the first image processing portion 806 of the image reading controller 310 through a second image communication portion 307. The AFE 207 converts the analog image signal received from the image reading sensor 208 into the digital image signal, and transmits the digital image signal to the first image processing portion 806 of the image reading controller 310 through the second image communication portion 307. The AFE 207 includes a test image pattern generation portion (image signal generation portion) 217 configured to generate an image signal based on a test image pattern (predetermined pattern). In a test mode, the AFE 207 transmits the test image pattern generated by the test image pattern generation portion 217 to the first image processing portion 806 through the second image communication portion 307 without transmitting the horizontal sync signal Hsync to the image reading sensor 208. The test image pattern generation portion 217 can generate a plurality of types of test image patterns.

The image reading command communication portion 302 and the second image communication portion 307 are communication lines included in the signal transmission cable 309 configured to connect the image reading controller 310 and the image reading unit 202. The signal transmission cable 309 is a flat cable obtained by grouping about 50 signal lines in a planar shape. The signal transmission cable 309 bends when the image reading unit 202 moves in the sub-scanning direction SS. The signal transmission cable 309 has a bending state changed as the image reading unit 202 moves.

The first image processing portion 806 performs various kinds of filter processing including shading correction on the image signal received at a time of reading the image of the original, and then transmits the image signal to a second image processing portion 905 of the image processing controller 300 through a third image communication portion 308. In the test mode, the first image processing portion 806 may stop the image signal so as to avoid transmitting a test image pattern transmitted from the AFE 207 to the second image processing portion 905.

The image processing controller 300 includes a second CPU 901 being a central processing unit, a second ROM 902 being a read-only memory, a second RAM 903 being a random-access memory, a console unit 904, the second image processing portion 905, and an image memory 906. The second ROM 902 stores a control program. The second RAM 903 stores input data and work data. The second CPU 901 receives operation information input by the console unit 904. When instructed to start reading by the user through the console unit 904, the second CPU 901 transmits a reading start command to the first CPU 801 through a second command communication portion 301. When receiving the reading start command, the first CPU 801 starts an operation for reading an image. The second image processing portion 905 performs various kinds of filter processing on the image signal received from the first image processing portion 806, and stores image data in the image memory 906. The second CPU 901 executes printout for copying and transmission to a network based on the operation information received through the console unit 904.

<Disconnection Determination Operation for Signal Transmission Cable>

Figure 3B:
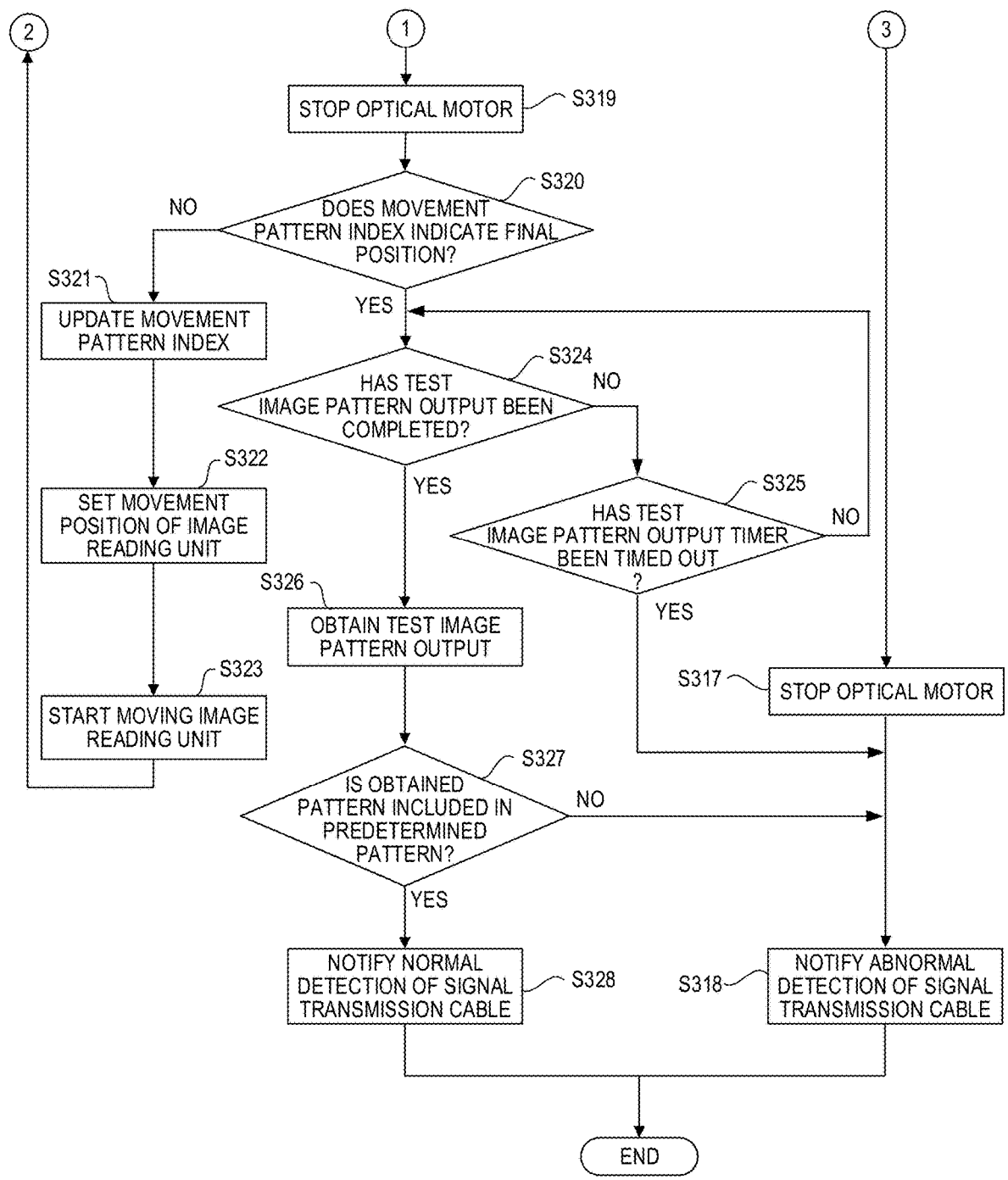
FIG. 3B is a flow chart for illustrating a disconnection determination operation of a signal transmission cable, which is executed by a first CPU.

The signal transmission cable 309 further bends as the image reading unit 202 moves, and may therefore be disconnected. The image reading apparatus 200 according to the first embodiment is operable in a self-diagnosis mode for detecting a disconnection in the signal transmission cable 309 by outputting a test image pattern while moving the image reading unit 202. The image reading apparatus 200 has a checking function of verifying the image signal of the test image pattern output through the signal transmission cable 309 under a state in which the bending state of the signal transmission cable 309 is being changed by moving the image reading unit 202 in the self-diagnosis mode. Now, with reference to FIG. 3, a disconnection (wire break) determination operation for the signal transmission cable 309 is described. FIG. 3 which is composed of FIG. 3A and FIG. 3B is a flow chart for illustrating the disconnection determination operation for the signal transmission cable 309, which is executed by the first CPU 801. The first CPU 801 serving as a controller executes the disconnection determination operation in accordance with the control program stored in the first ROM 802.

Figure 4A:
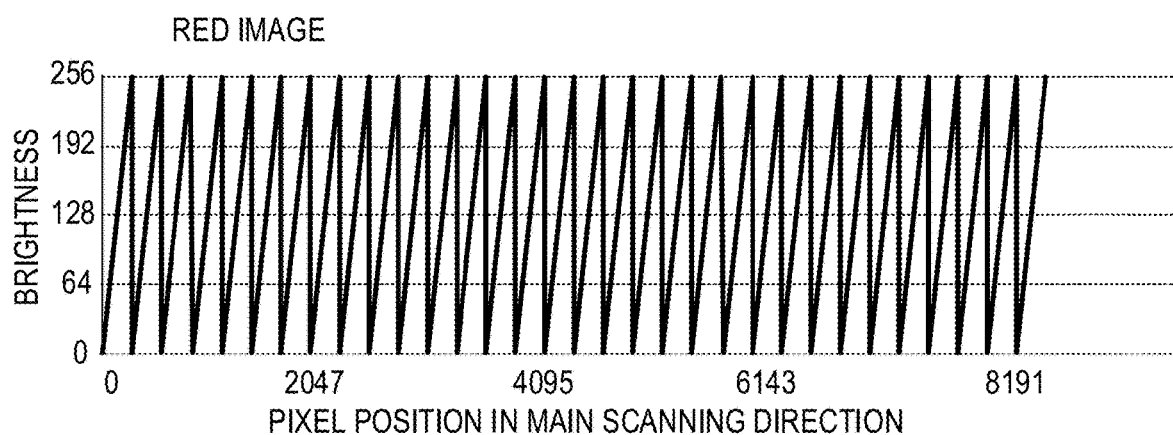
FIG. 4A, FIG. 4B, and FIG. 4C are diagrams for illustrating normal waveforms exhibited at a time of checking an incremental image output pattern.
Figure 4B:
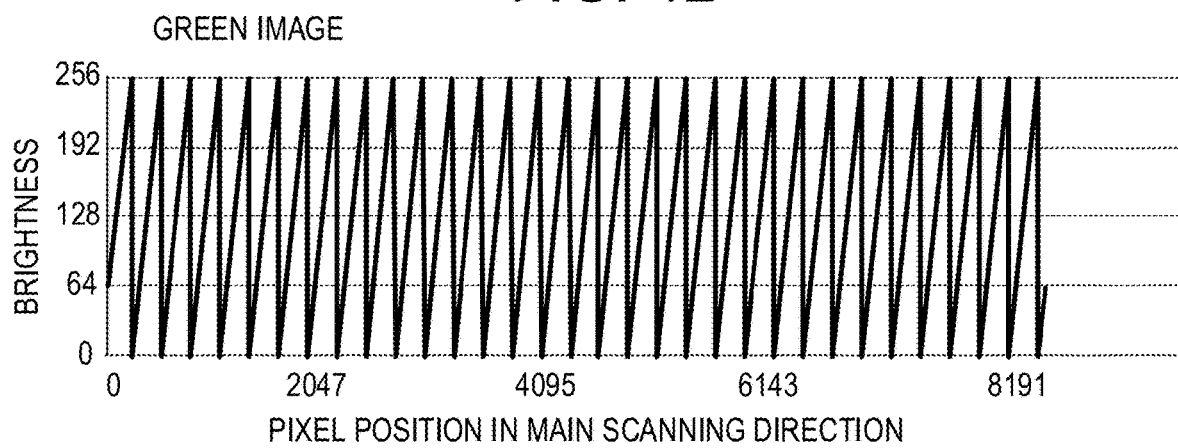
Figure 4C:
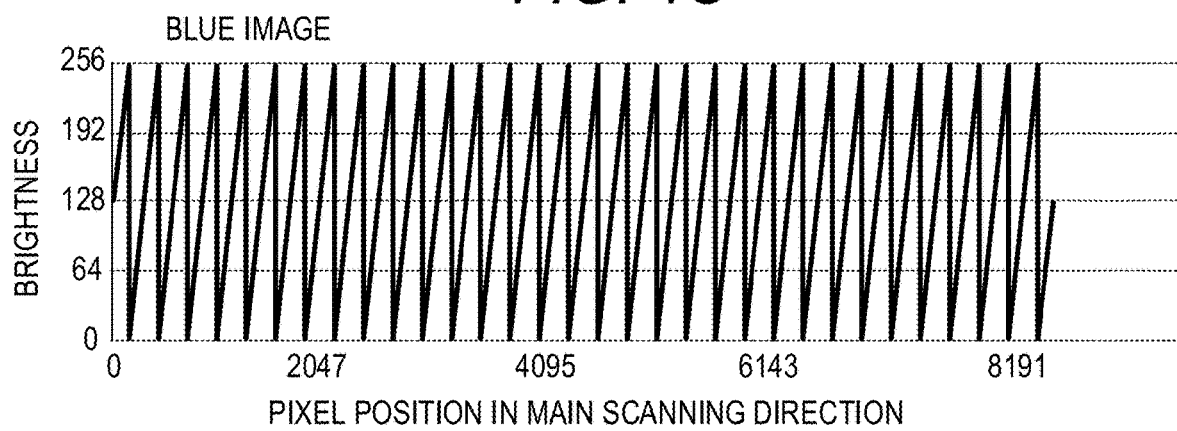

When the disconnection determination operation is started, the first CPU 801 sets a test image pattern index to 0 (Step S301). The test image pattern index is an index for selecting a kind of the test image pattern to be transmitted to the first image processing portion 806 by the AFE 207. With reference to FIG. 4A, FIG. 4B, FIG. 4C, FIG. 5, and FIG. 6, an example of the kind of the test image pattern is described. FIG. 4A, FIG. 4B, and FIG. 4C are diagrams for illustrating normal waveforms exhibited at a time of checking an incremental image output pattern. The example of the test image pattern illustrated in FIG. 4A, FIG. 4B, and FIG. 4C indicates an incremental image output pattern for outputting a brightness value periodically changing while incrementing the pixels up to the 8,192nd pixels in the main scanning direction for each of a red image, a green image, and a blue image. The brightness value of an x-th pixel of the incremental image output pattern serving as the test image pattern illustrated in FIG. 4A, FIG. 4B, and FIG. 4C in the main scanning direction is expressed by the following expressions.

$$\text{Image}(x) = x \pmod{256} \quad \text{Red image:}$$

Image(x)=x+64 (mod 256) Green image:

Image(x)=x+128 (mod 256) Blue image:

As illustrated in FIG. 4A, FIG. 4B, and FIG. 4C, the incremental image output pattern exhibits brightness output having a saw blade shape. The test image pattern generation portion 217 of the AFE 207 has a function of outputting signal waveforms of the incremental image output pattern illustrated in FIG. 4A, FIG. 4B, and FIG. 4C.

Figure 5:
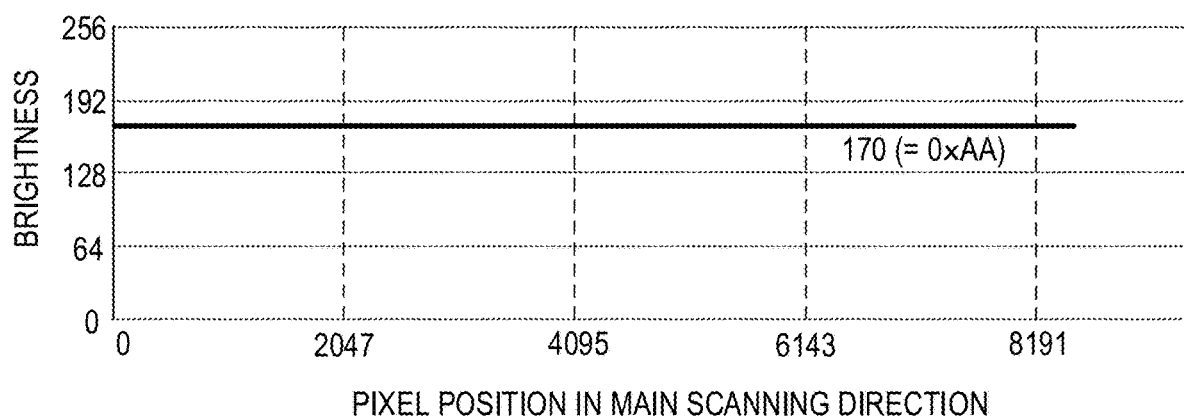
FIG. 5 is a diagram for illustrating a normal waveform exhibited at a time of checking a first fixed data (0xAA) image output pattern.
Figure 6:
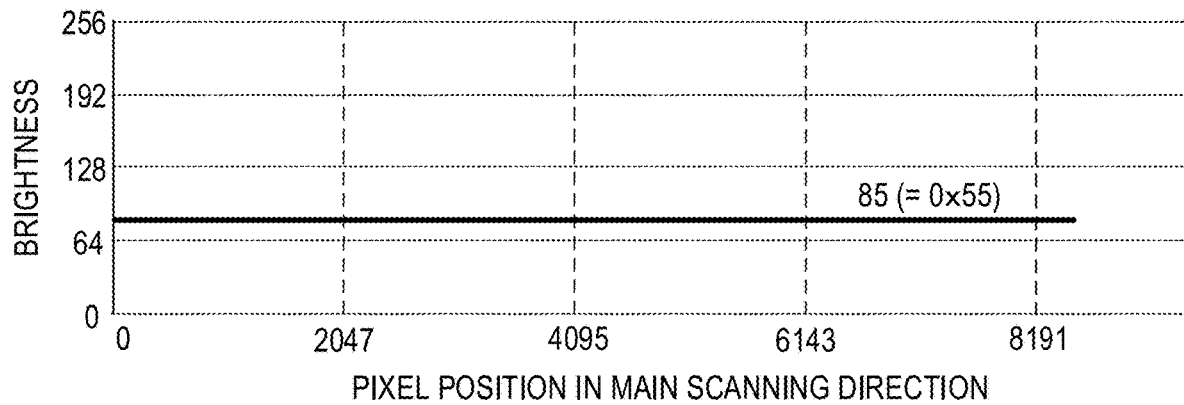
FIG. 6 is a diagram for illustrating a normal waveform exhibited at a time of checking a second fixed data (0x55) image output pattern.

FIG. 5 is a diagram for illustrating a normal waveform exhibited at a time of checking a first fixed data (0xAA) image output pattern. In the example of the test image pattern illustrated in FIG. 5, a brightness value of 170 (AA in hexadecimal) is uniformly output in the main scanning direction. FIG. 6 is a diagram for illustrating a normal waveform exhibited at a time of checking a second fixed data (0x55) image output pattern. In the example of the test image pattern illustrated in FIG. 6, a brightness value of 85 (55 in hexadecimal) is uniformly output in the main scanning direction. As illustrated in FIG. 5 and FIG. 6, the test image pattern generation portion 217 of the AFE 207 has a function of outputting a signal waveform of data fixed uniformly in the main scanning direction.

The test image pattern index of the incremental image output pattern illustrated in FIG. 4A, FIG. 4B, and FIG. 4C is set as 0. The test image pattern index of the first fixed data image output pattern illustrated in FIG. 5 is set as 1. The test image pattern index of the second fixed data image output pattern illustrated in FIG. 6 is set as 2. In order to select and check those test image patterns, in Step S301, the first CPU 801 initializes the test image pattern index to 0.

Figure 7:
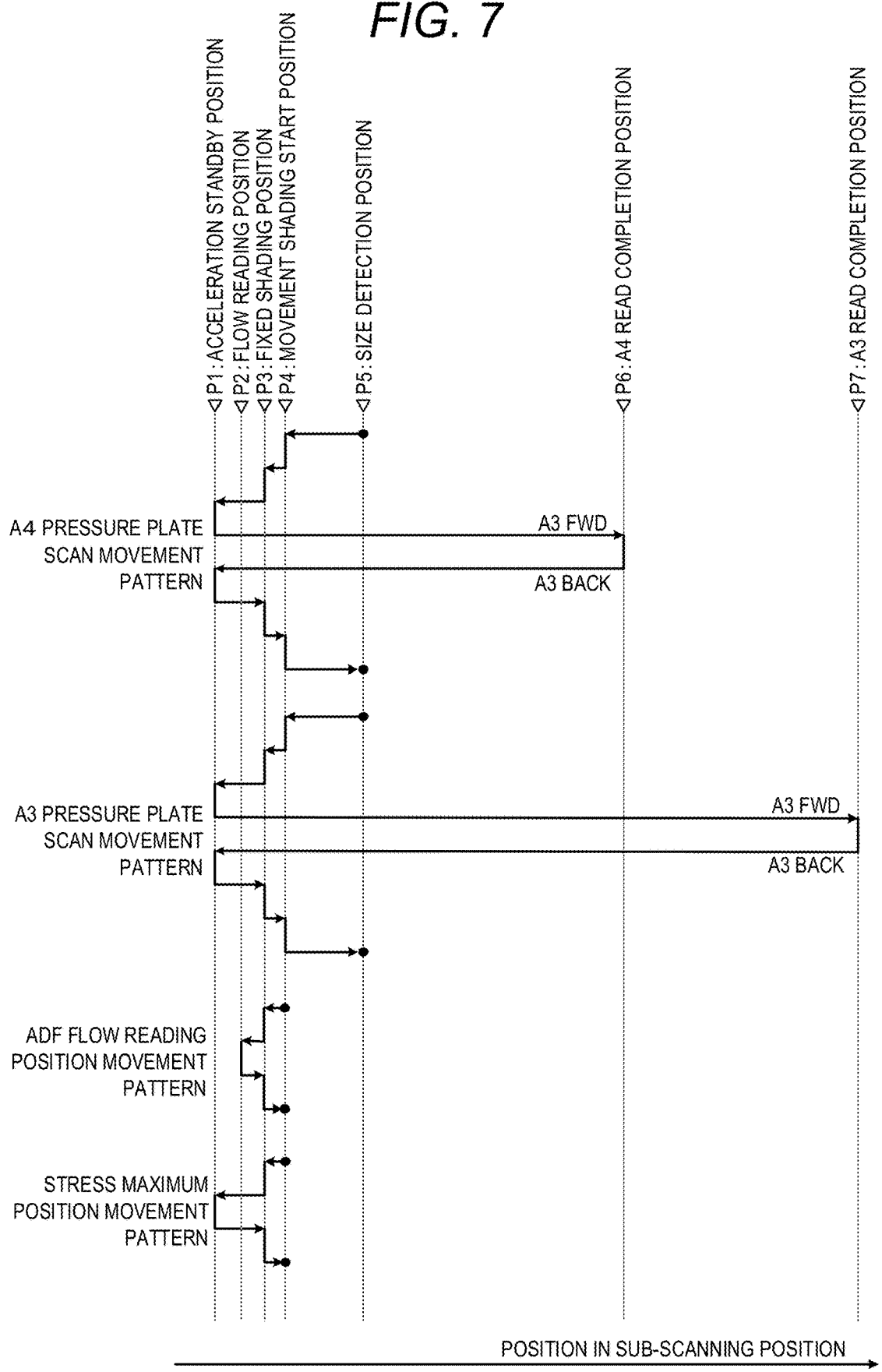
FIG. 7 is a diagram for illustrating a movement pattern of an image reading unit in a sub-scanning direction, which is exhibited during the disconnection determination operation.

Subsequently, the first CPU 801 sets a movement pattern index to 0 (Step S302). The movement pattern index is an index for selecting a position to which the image reading unit 202 is to be moved. With reference to FIG. 7, examples of the position to which the image reading unit 202 is to be moved are described. FIG. 7 is a diagram for illustrating a movement pattern of the image reading unit 202 in the sub-scanning direction SS, which is exhibited during the disconnection determination operation. In FIG. 7, the horizontal axis represents a position in the sub-scanning direction SS, and the downward direction indicates a lapse of time during the movement. In FIG. 7, as examples of the position to which the image reading unit 202 is to be moved, there are illustrated an acceleration standby position P1, a flow reading position P2, a fixed shading position P3, a movement shading start position P4, a size detection position P5, an A4 read completion position P6, and an A3 read completion position P7. The image reading unit 202 stands by for movement start at the acceleration standby position P1. When the image reading apparatus 200 includes an automatic document feeder (hereinafter referred to as "ADF"), the image reading unit 202 reads the image of the original being conveyed by the ADF at the flow reading position P2. The image reading unit 202 executes the shading control at the fixed shading position P3 below the shading white plate 210. The image reading unit 202 executes movement shading control at the movement shading start position P4. The image reading unit 202 executes size detection at the size detection position P5. The image reading unit 202 completes the operation for reading the image of an A4-size original at the A4 read completion position P6. The image reading unit 202 completes the operation for reading the image of an A3-size original at the A3 read completion position P7.

The movement pattern index refers to a numerical value indicating a position at which an operation corresponding thereto is being executed in a table obtained by arranging positions corresponding to operations to be executed in their execution order. For example, a table for an A4 pressure plate scan movement pattern illustrated at the top of FIG. 7 is {P5, P4, P3, P1, P6, P1, P3, P4, P5}. The image reading unit 202 is moved to the positions indicated in the table of {P5, P4, P3, P1, P6, P1, P3, P4, P5} in the stated order. In this case, the movement pattern index indicating the size detection position P5 to be first moved to is 0. After the image reading unit 202 is moved to the size detection position P5, the movement pattern index is updated to 1. The movement pattern index of 1 indicates the movement shading start position P4, and hence the image reading unit 202 is next moved to the movement shading start position P4.

A table for an A3 pressure plate scan movement pattern illustrated in FIG. 7 is {P5, P4, P3, P1, P7, P1, P3, P4, P5}. A table for an ADF flow reading position movement pattern is {P4, P3, P2, P3, P4}. A table for a stress maximum position movement pattern is {P4, P3, P1, P3, P4}. The stress maximum position is a position of the image reading unit 202 at which the signal transmission cable 309 configured to transmit the image signal is bent and a stress applied to the signal transmission cable 309 is maximized. The stress maximum position varies depending on a path along which the signal transmission cable 309 is laid. In the first embodiment, when the image reading unit 202 is located at the acceleration standby position P1, which is the leftmost position illustrated in FIG. 7, the stress applied to the signal transmission cable 309 is maximized, and hence the acceleration standby position P1 is the stress maximum position.

The image reading unit 202 can also be moved in a plurality of movement patterns. In this case, the tables for the plurality of movement patterns are combined. For example, in a case where the image reading unit 202 is moved in the stress maximum position movement pattern two times in a row and is then moved in the A3 pressure plate scan movement pattern one time, a movement pattern table therefor is obtained as follows. {P4, P3, P1, P3, P4, P3, P1, P3, P4, P5, P4, P3, P1, P7, P1, P3, P4, P5}

This movement pattern table includes 18 positions. In the first embodiment, an example of executing the disconnection determination operation through use of a pattern for moving the image reading unit 202 based on the movement pattern table including those 18 positions is described.

Subsequently, the first CPU 801 sets the movement position of the image reading unit 202 (Step S303). The movement position is set through use of the position of the currently stopped image reading unit 202 identified by home position search, which is generally executed, and the position of the next movement destination designated from the movement pattern table by the movement pattern index. Specifically, the setting of the movement position refers to the setting of such a distance that the image reading unit 202 is stopped at the position of the movement destination when the optical motor 804 configured to move the image reading unit 202 is stopped through use of a built-in timer (not shown) of the first CPU 801. The distance set at this time is calculated based on a difference between the position of the next movement destination designated from the movement pattern table by the movement pattern index and the position of the currently stopped image reading unit 202.

Figure 8:
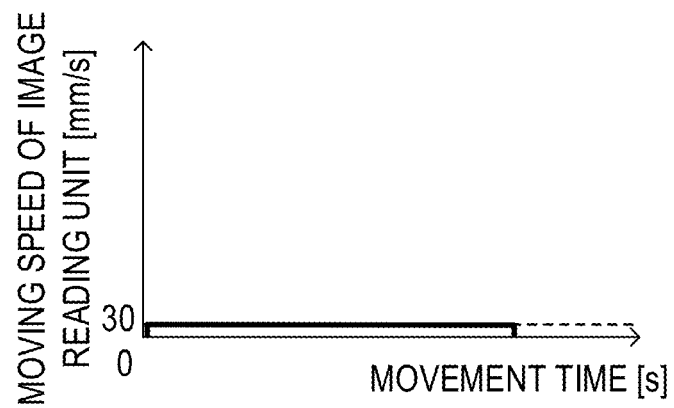
FIG. 8 is a graph for showing a moving speed of the image reading unit, which is exhibited under self-start control.
Figure 9:
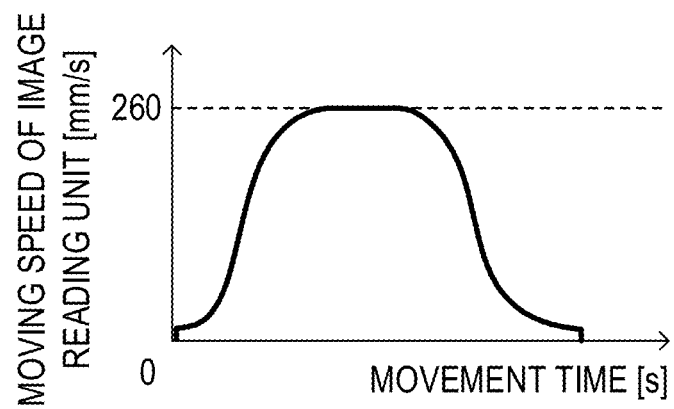
FIG. 9 is a graph for showing a moving speed of the image reading unit, which is exhibited under acceleration and deceleration control.

Subsequently, the first CPU 801 starts moving the image reading unit 202 (Step S304). The first CPU 801 controls the optical motor 804 to move the image reading unit 202. When the distance by which the image reading unit 202 is to be moved is shorter than a total distance of an acceleration distance, a stabilization waiting distance, and a deceleration distance of the optical motor 804, the first CPU 801 drives the optical motor 804 under self-start control. FIG. 8 is a graph for showing a moving speed of the image reading unit 202, which is exhibited under the self-start control. The image reading unit 202 is moved at a constant speed under the self-start control. When the distance by which the image reading unit 202 is to be moved is equal to or longer than the total distance of the acceleration distance, the stabilization waiting distance, and the deceleration distance of the optical motor 804, the first CPU 801 drives the optical motor 804 under acceleration and deceleration control. FIG. 9 is a graph for showing a moving speed of the image reading unit 202, which is exhibited under the acceleration and deceleration control. Under the acceleration and deceleration control, the image reading unit 202 is moved while changing its speed among acceleration, maintaining of constant speed, and deceleration.

Subsequently, the first CPU 801 sets the test image pattern output (Step S305). The test image pattern index is initialized to 0 in Step S301, and hence the test image pattern to be output from the AFE 207 is set to the incremental image output pattern illustrated in FIG. 4A, FIG. 4B, and FIG. 4C. The incremental image output pattern exhibits the output of the periodically changing brightness value while the pixels are incremented up to the 8,192nd pixels in the main scanning direction for each of the red image, the green image, and the blue image. Subsequently, the first CPU 801 starts outputting the test image pattern (Step S306). The first CPU 801 issues a command to instruct the AFE 207 to output the test image pattern from the first command transmitting and receiving portion 205 through intermediation of the second command transmitting and receiving portion 206.

Subsequently, the first CPU 801 starts counting a test image pattern output timer (Step S307). The AFE 207 generates the horizontal sync signal Hsync. When a communication line included in the second image communication portion 307 configured to transmit the horizontal sync signal Hsync output from the AFE 207 to the first image processing portion 806 is disconnected, the first image processing portion 806 cannot normally receive the test image pattern from the AFE 207. A count of the test image pattern output timer is used for determining whether or not the communication line included in the second image communication portion 307 is disconnected. The test image pattern output timer is a built-in system timer of the first CPU 801. The test image pattern output timer may be set so as to time out within a predetermined time period (for example, within one second) sufficiently longer than an output time period (for example, 100 μs) of the horizontal sync signal Hsync. The test image pattern output timer is used for determining whether or not the first image processing portion 806 has normally received the image signal of the test image pattern from the AFE 207 in Step S309 described later. The predetermined time period is set so as to avoid being stuck in a state of waiting for completion of the output of the image signal of the test image pattern set in Step S305 even when the communication line (horizontal sync signal line) included in the second image communication portion 307 and configured to transmit the horizontal sync signal Hsync is disconnected. The first CPU 801 detects that there is an abnormality in the signal transmission cable 309 when the horizontal sync signal Hsync is not received within a predetermined time period from the start of output of the test image pattern from the AFE 207.

Figure 10A:
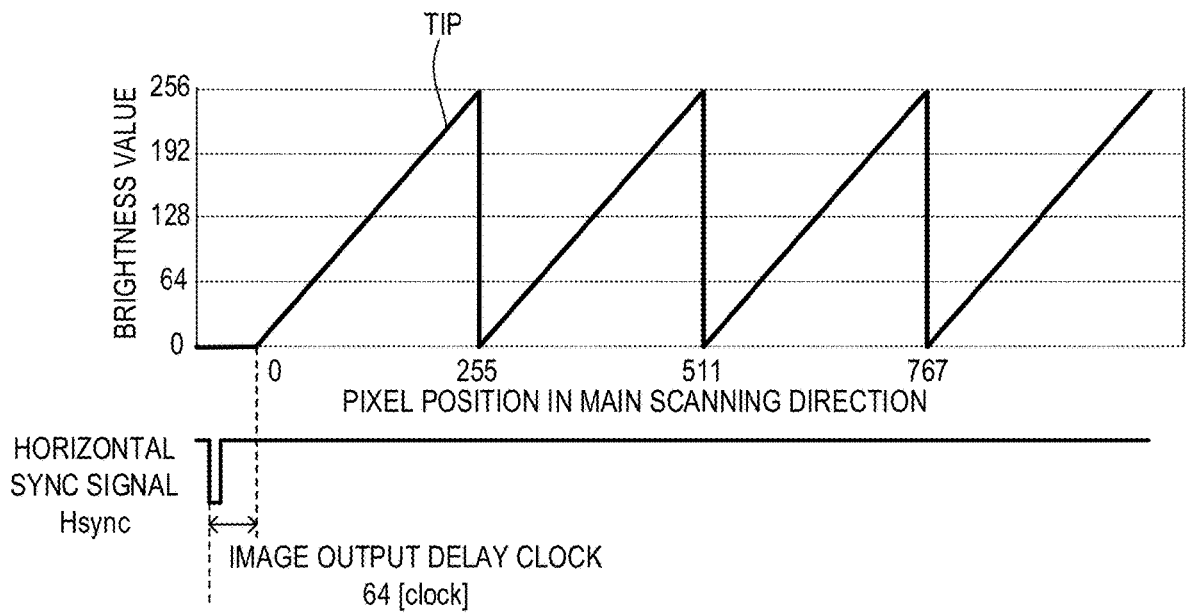
FIG. 10A and FIG. 10B are diagrams for each illustrating a horizontal sync signal and a test image pattern.
Figure 10B:
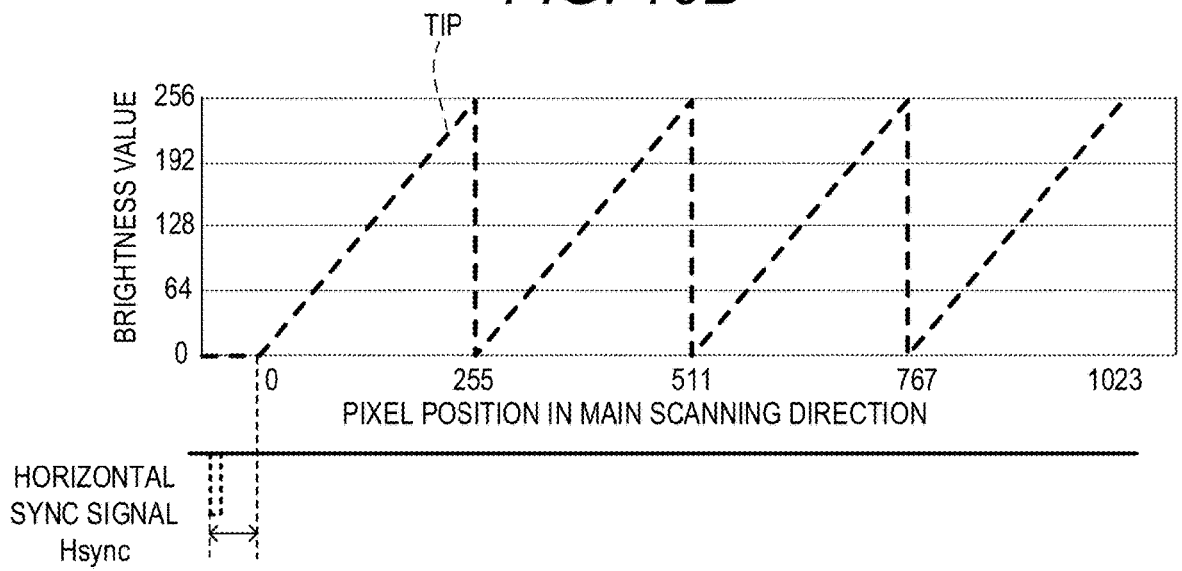

FIG. 10A and FIG. 10B are diagrams for each illustrating the horizontal sync signal Hsync and an image signal TIP of a test image pattern. FIG. 10A is a diagram indicating that the first image processing portion 806 can receive the image signal TIP of the test image pattern when the first image processing portion 806 normally receives the horizontal sync signal Hsync. The AFE 207 outputs the image signal TIP of the test image pattern after a predetermined clock (in the first embodiment, 64 clocks) from a falling edge of the horizontal sync signal Hsync. As illustrated in FIG. 10A, with the falling edge of the horizontal sync signal Hsync being used as a trigger, the first image processing portion 806 receives the image signal TIP of the test image pattern after the predetermined clock (image output delay clock) has elapsed from the timing of the trigger. However, when the communication line (horizontal sync signal line) included in the second image communication portion 307 is disconnected, the first image processing portion 806 cannot receive the horizontal sync signal Hsync being the trigger for receiving the image signal TIP of the test image pattern. FIG. 10B is a diagram indicating that the first image processing portion 806 cannot receive the image signal TIP of the test image pattern when the first image processing portion 806 cannot receive the horizontal sync signal Hsync. As illustrated in FIG. 10B, the first image processing portion 806 cannot normally receive the image signal TIP of the test image pattern when the first image processing portion 806 cannot receive the horizontal sync signal Hsync.

Subsequently, the first CPU 801 determines whether or not the AFE 207 has completed outputting the image signal of the test image pattern (Step S308). The determination as to whether or not the AFE 207 has completed outputting the image signal of the test image pattern is performed based on whether or not the first image processing portion 806 has read out a register indicating that an image signal corresponding to a predetermined number of lines has been received. When the output of the image signal of the test image pattern has not been completed (NO in Step S308), the first CPU 801 determines whether or not the test image pattern output timer has been timed out (Step S309). The first CPU 801 determines whether or not a count value of the test image pattern output timer has arrived within the predetermined time period, which is set so as to avoid being stuck in the state of waiting for completion of the output of the image signal of the test image pattern due to a disconnection in the horizontal sync signal line of the second image communication portion 307.

When the test image pattern output timer has not been timed out (NO in Step S309), the first CPU 801 determines whether or not the image reading unit 202 has arrived at the movement position (Step S310). That is, the first CPU 801 determines whether or not the movement of the image reading unit 202 to the movement position set in Step S303 has been completed. The first CPU 801 determines whether or not the value of the distance count register of the built-in timer (not shown) of the first CPU 801 has reached the set distance, to thereby determine whether or not the image reading unit 202 has arrived at the movement position set in Step S303. Depending on the function of the first CPU 801, the determination can also be performed by receiving an interrupt after a predetermined distance has been reached.

When the image reading unit 202 has not arrived at the movement position (NO in Step S310), the first CPU 801 returns the processing to Step S308. During the loop of Step S308, Step S309, and Step S310, the first CPU 801 waits for any one of the completion of the test image pattern output (YES in Step S308), the detection of an abnormality in the horizontal sync signal (YES in Step S309), and the completion of the movement of the image reading unit (YES in Step S310).

When the output of the image signal of the test image pattern has been completed (YES in Step S308), the first CPU 801 obtains the image signal of the test image pattern from the first image processing portion 806 (Step S311). The first image processing portion 806 holds the image signal of the incremental image output pattern serving as the test image pattern, which is output from the AFE 207 and illustrated in FIG. 4A, FIG. 4B, and FIG. 4C. The first CPU 801 obtains the brightness value of the image signal of the test image pattern from the first image processing portion 806. The first CPU 801 determines whether or not the brightness value (obtained pattern) of the image signal of the test image pattern obtained in Step S311 is included in the predetermined pattern (Step S312). For example, in the first embodiment, an incremental image output pattern corresponding to each of test image pattern indices of 0, 1, and 2, the first fixed data image output pattern, and the second fixed data image output pattern are provided as the predetermined patterns. The first CPU 801 compares the obtained pattern with the predetermined pattern, and detects that there is an abnormality in the signal transmission cable 309 when the obtained pattern is not included in the predetermined pattern.

When the test image pattern index is 0, the first CPU 801 determines whether or not the obtained pattern matches the incremental image output pattern illustrated in FIG. 4A, FIG. 4B, and FIG. 4C. Specifically, the first CPU 801 determines whether or not the brightness value of the x-th pixel of the obtained test image pattern in the main scanning direction matches the following expressions.

$Image(x)=x$ (mod 256)　　　　　　Red image:

$Image(x)=x+64$ (mod 256)　　　　　Green image:

$Image(x)=x+128$ (mod 256)　　　　Blue image:

When the obtained pattern matches the incremental image output pattern with the test image pattern index being 0 (YES in Step S312), the first CPU 801 advances the processing to Step S313.

When the test image pattern index is 1 in Step S312, the first CPU 801 determines whether or not the obtained pattern matches the first fixed data image output pattern illustrated in FIG. 5. Specifically, the first CPU 801 determines whether or not all pixels of RGB image lines of the obtained test image pattern match the brightness value of 170 (AA in hexadecimal) used as the fixed value, which is illustrated in FIG. 5. When the obtained pattern matches the first fixed data image output pattern with the test image pattern index being 1 (YES in Step S312), the first CPU 801 advances the processing to Step S313.

When the test image pattern index is 2 in Step S312, the first CPU 801 determines whether or not the obtained pattern matches the second fixed data image output pattern illustrated in FIG. 6. Specifically, the first CPU 801 determines whether or not all pixels of RGB image lines of the obtained test image pattern match the brightness value of 85 (55 in hexadecimal) used as the fixed value, which is illustrated in FIG. 6. When the obtained pattern matches the second fixed data image output pattern with the test image pattern index being 2 (YES in Step S312), the first CPU 801 advances the processing to Step S313.

In the first embodiment, it is determined whether or not the obtained pattern matches the predetermined pattern without deviating even by 1 bit, but the first embodiment is not limited thereto. For example, a less significant bit exhibiting less image influence may be masked and removed from a target to be determined. The first embodiment presents an example of a measure for determining whether or not an expected predetermined pattern has been obtained, and is not limited to whether or not the obtained pattern matches the predetermined pattern without deviating even by 1 bit.

Figure 11A:
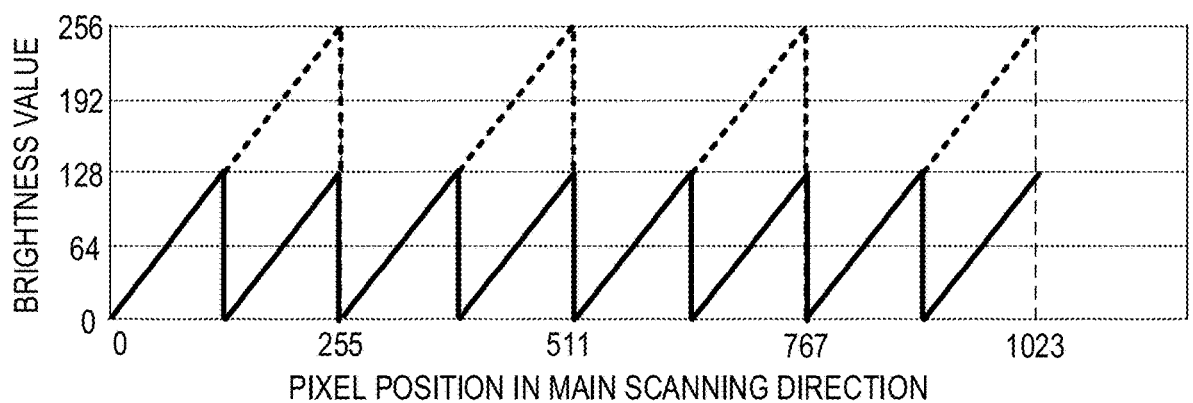
FIG. 11A and FIG. 11B are diagrams for illustrating abnormal waveforms of the incremental image output pattern.
Figure 11B:
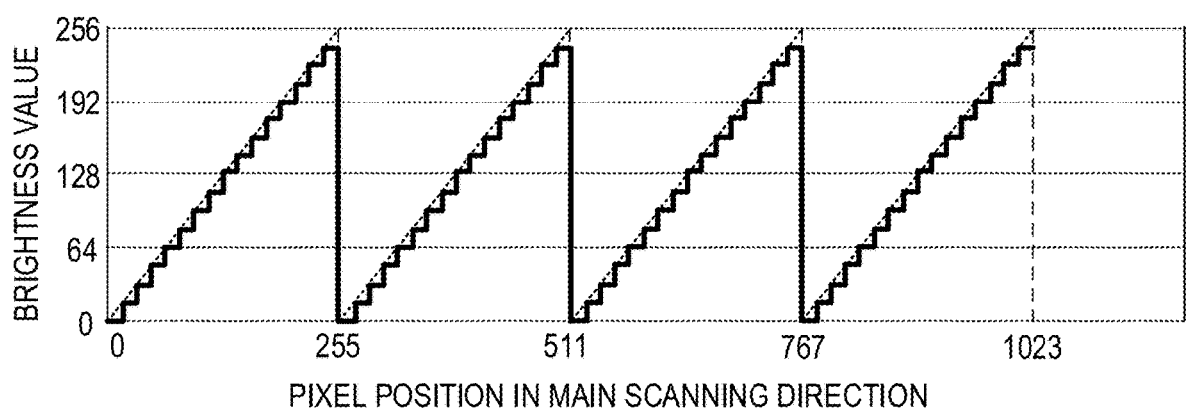

With reference to FIG. 11A, FIG. 11B, FIG. 12A, and FIG. 12B, examples of waveforms of the image signal of the obtained pattern that are exhibited when the obtained pattern is determined not to be included in the predetermined pattern (NO in Step S312) are illustrated. FIG. 11A and FIG. 11B are diagrams for illustrating abnormal waveforms of the incremental image output pattern. In FIG. 11A and FIG. 11B, only 1,024 pixels at the head of the 8,192 pixels in the main scanning direction are illustrated. FIG. 11A is an illustration of an abnormal waveform indicating a loss of the most significant bit of the incremental image output pattern. In FIG. 11A, the solid line represents a waveform of the image signal in which the most significant bit of 8 bits remains 0 when the test image pattern index is 0. In FIG. 11A, the dotted line represents a normal waveform of the image signal of the incremental image output pattern. The obtained pattern indicated by the solid line of FIG. 11A exhibits an example of an abnormal waveform that does not match the predetermined pattern. FIG. 11B is an illustration of an abnormal waveform indicating a loss of the less significant 4 bits of the incremental image output pattern. In FIG. 11B, the solid line represents a waveform of the image signal in which the less significant 4 bits of 8 bits remain 0 when the test image pattern index is 0. In FIG. 11B, the dotted line represents the normal waveform of the image signal of the incremental image output pattern. The obtained pattern indicated by the solid line of FIG. 11B exhibits an example of the abnormal waveform that does not match the predetermined pattern.

Figure 12A:
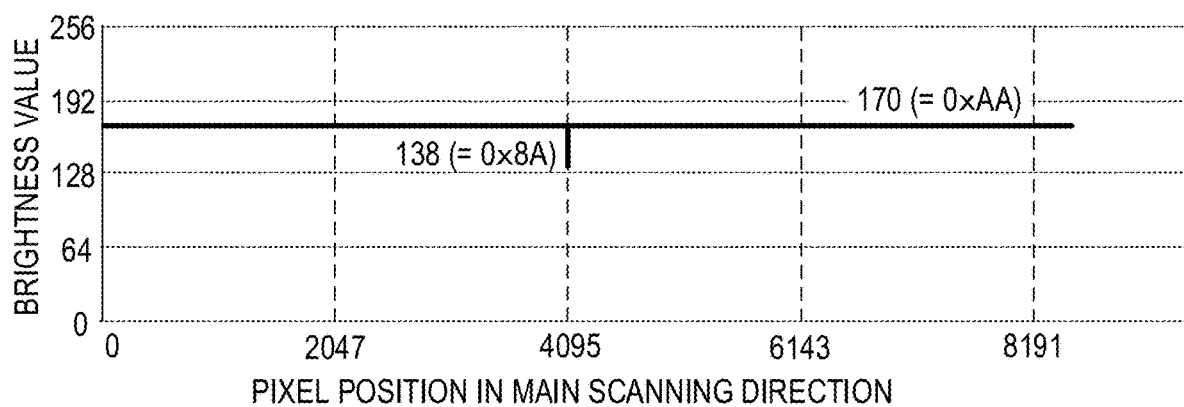
FIG. 12A and FIG. 12B are diagrams for illustrating abnormal waveforms of fixed data image output patterns.
Figure 12B:
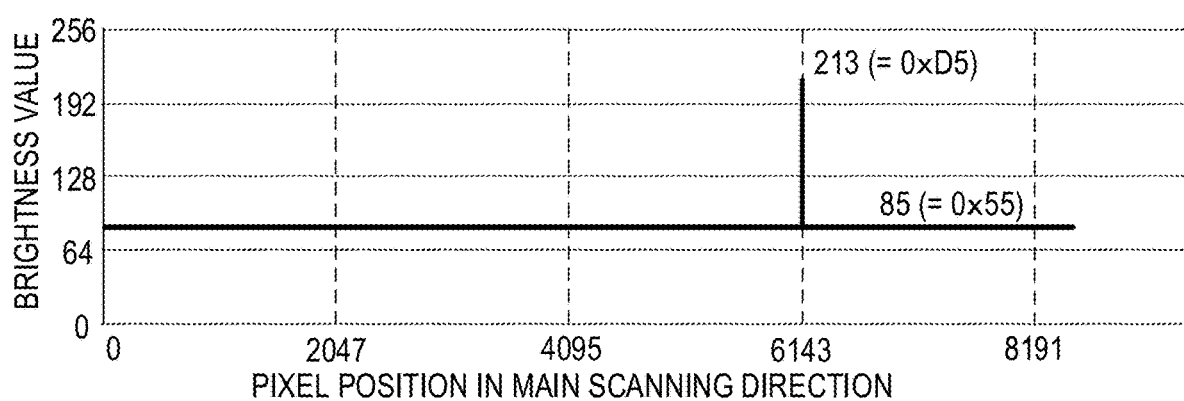

FIG. 12A and FIG. 12B are diagrams for illustrating abnormal waveforms of the fixed data image output patterns. FIG. 12A is an illustration of a 1-bit-per-pixel abnormal waveform of the first fixed data (0xAA) image output pattern. There is illustrated an example of the waveform of the image signal in which, when the test image pattern index is 1, a brightness value of 138 (8A in hexadecimal) is received at 4,095th pixel, and the fixed brightness value of 170 (AA in hexadecimal) is received at the other pixels. The brightness value of 138 (8A in hexadecimal) of the 4,095th pixel is an abnormal signal. FIG. 12B is an illustration of a 1-bit-per-pixel abnormal waveform of the second fixed data (0x55) image output pattern. There is illustrated an example of the waveform of the image signal in which, when the test image pattern index is 2, a brightness value of 213 (D5 in hexadecimal) is received at the 6,143rd pixel, and the fixed brightness value of 85 (55 in hexadecimal) is received at the other pixels. The brightness value of 213 (8A in hexadecimal) of the 6,143rd pixel is an abnormal signal.

When the obtained pattern is not included in the predetermined pattern (NO in Step S312), the first CPU 801 stops the optical motor 804 configured to move the image reading unit 202 (Step S317). The first CPU 801 notifies the second CPU 901 that an abnormality has been detected in the signal transmission cable 309 (Step S318). The second CPU 901 can display on the console unit 904 that there is an abnormality in the signal transmission cable 309, and can notify a management server that there is an abnormality in the signal transmission cable 309. With this operation, a disconnection in the communication line (horizontal sync signal line) included in the signal transmission cable 309 can be detected, and hence maintainability of the image reading apparatus 200 is improved. The first CPU 801 brings the disconnection determination operation to an end.

Meanwhile, when the obtained pattern is included in the predetermined pattern (YES in Step S312), the first CPU 801 updates the test image pattern index (Step S313). When the test image pattern index is represented by idx_i, a test image pattern index idx_i is updated so as to satisfy:

$$idx\_i = idx\_i + 1 \pmod{3}.$$

That is, the test image pattern index idx_i is cyclically updated so as to be set to 1 when the test image pattern index is 0, set to 2 when the test image pattern index is 1, and set to 0 when the test image pattern index is 2.

Subsequently, the first CPU 801 sets the output of the test image pattern (Step S314). When the test image pattern index updated in Step S313 is 1, the test image pattern to be output from the AFE 207 is set to the first fixed data image output pattern illustrated in FIG. 5. When the test image pattern index updated in Step S313 is 2, the test image pattern to be output from the AFE 207 is set to the second fixed data image output pattern illustrated in FIG. 6. When the test image pattern index updated in Step S313 is 0, the test image pattern to be output from the AFE 207 is set to the incremental image output pattern illustrated in FIG. 4A, FIG. 4B, and FIG. 4C.

Subsequently, the first CPU 801 starts outputting the test image pattern (Step S315). The first CPU 801 issues a command to instruct the AFE 207 to output the set test image pattern from the first command transmitting and receiving portion 205 through intermediation of the second command transmitting and receiving portion 206. Subsequently, the first CPU 801 starts counting a test image pattern output timer (Step S316). Subsequently, the first CPU 801 returns the processing to Step S308. During the loop of Step S308, Step S309, and Step S310, the first CPU 801 waits for any one of the completion of the test image pattern output (YES in Step S308), the detection of an abnormality in the horizontal sync signal (YES in Step S309), and the completion of the movement of the image reading unit (YES in Step S310).

When the test image pattern output timer has been timed out (YES in Step S309), the first CPU 801 stops the optical motor 804 configured to move the image reading unit 202 (Step S317). When the test image pattern output timer has been timed out, the first image processing portion 806 cannot receive the horizontal sync signal Hsync as illustrated in FIG. 10B. This inhibits the first image processing portion 806 from receiving the image signal TIP of the test image pattern from the AFE 207. Therefore, the first CPU 801 determines that there is an abnormality in the communication line (horizontal sync signal line) included in the signal transmission cable 309 without determining whether or not the obtained pattern is included in the predetermined pattern. The first CPU 801 notifies the second CPU 901 that an abnormality has been detected in the signal transmission cable 309 (Step S318), and brings the disconnection determination operation to an end.

When the image reading unit 202 arrives at the movement position (YES in Step S310), the first CPU 801 stops the optical motor 804 configured to move the image reading unit 202 (Step S319). The first CPU 801 determines whether or not the movement pattern index indicates the final position (Step S320). In the first embodiment, the image reading unit 202 is moved based on the movement pattern table including 18 positions as described above, and hence the first CPU 801 determines whether or not the movement pattern index indicates the 18th position. When the movement pattern index does not indicate the final position (NO in Step S320), that is, when the movement pattern index indicates a position less than 18th position, the first CPU 801 updates the movement pattern index (Step S321). When the movement pattern index is represented by idx_m, a movement pattern index idx_m is updated so as to satisfy:

$$idx\_m = idx\_m + 1.$$

Subsequently, the first CPU 801 sets the movement position of the image reading unit 202 (Step S322). The setting of the movement position is the same as that of Step S303, and hence a description thereof is omitted. Subsequently, the first CPU 801 starts moving the image reading unit 202 (Step S323). The movement of the image reading unit 202 is performed by controlling the optical motor 804 in the same manner as in Step S304, and hence a description thereof is omitted. Subsequently, the first CPU 801 returns the processing to Step S308.

When the movement pattern index indicates the final position in Step S320 (YES in Step S320), that is, when the 18th movement has been completed, the first CPU 801 determines whether or not the output of the image signal of the test image pattern has been completed (Step S324). When the output of the image signal of the test image pattern has not been completed (NO in Step S324), the first CPU 801 determines whether or not the test image pattern output timer has been timed out (Step S325). This determination is the same as that of Step S309, and hence a description thereof is omitted. When the test image pattern output timer has not been timed out (NO in Step S325), the first CPU 801 returns the processing to Step S324, and waits for the completion of the output of the image signal of the test image pattern. Meanwhile, when the test image pattern output timer has been timed out (YES in Step S325), the first CPU 801 notifies the second CPU 901 that an abnormality has been detected in a signal transmission cable (Step S318), and brings the disconnection determination operation to an end.

When it is determined in Step S324 that the output of the image signal of the test image pattern has been completed (YES in Step S324), the first CPU 801 obtains the image signal of the test image pattern from the first image processing portion 806 (Step S326). Subsequently, the first CPU 801 determines whether or not the brightness value (obtained pattern) of the image signal of the test image pattern obtained in Step S326 is included in the predetermined pattern (Step S327). The determination of Step S327 is the same as that of Step S312, and hence a description thereof is omitted. When the obtained pattern is not included in the predetermined pattern (NO in Step S327), the first CPU 801 notifies the second CPU 901 that an abnormality has been detected in the signal transmission cable 309 (Step S318), and brings the disconnection determination operation to an end. Meanwhile, when the obtained pattern is included in the predetermined pattern (YES in Step S327), the first CPU 801 notifies the second CPU 901 that normal connection of the signal transmission cable 309 has been detected (Step S328). With this operation, it is possible to detect that the signal transmission cable 309 has been normally connected without having a disconnection. The first CPU 801 brings the disconnection determination operation to an end.

Figure 13:
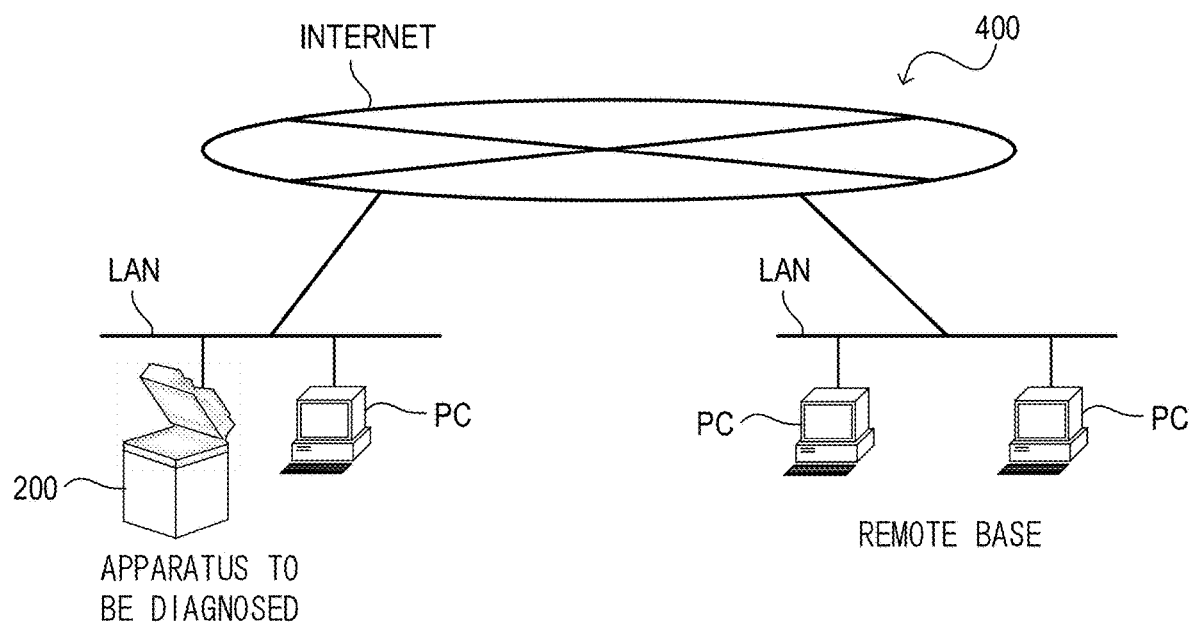
FIG. 13 is a diagram for illustrating a network for diagnosing the image reading apparatus from a remote base.

According to the first embodiment, it is possible to detect presence or absence of an abnormality in the signal transmission cable 309 of the image reading apparatus 200, which can improve the maintainability of the image reading apparatus 200. The image reading apparatus 200 can also be connected to a local area network (LAN), the Internet, or a public line network to be operated from an external personal computer (PC). FIG. 13 is a diagram for illustrating a network 400 for diagnosing the image reading apparatus 200 from a remote base. As illustrated in FIG. 13, without being required to check the disconnection determination operation on site for an abnormality diagnosis of the signal transmission cable 309 of the image reading apparatus 200, a service engineer is allowed to execute diagnosis control in order to identify a replacement part from the remote site. The service engineer can also check the disconnection determination operation on site for an abnormality diagnosis of the signal transmission cable 309. The image reading apparatus 200 can also be configured to execute the disconnection determination operation in order to allow the service engineer to re-examine the signal transmission cable 309 after a part that has caused an abnormality is replaced. In addition, the image reading apparatus 200 can be configured to be able to examine whether or not there is an abnormality in the signal transmission cable 309 while the image reading apparatus 200 is subjected to assembly inspection at a factory.

According to the first embodiment, it is possible to provide the image reading apparatus 200 capable of detecting an abnormality in the signal transmission cable 309.

In the first embodiment, the discrete image reading apparatus 200 has been described as an example of the image reading apparatus. However, the first embodiment is not limited thereto. For example, an ADF may be provided to the image reading apparatus 200. Further, the image reading apparatus 200 may be provided to a copying machine, a facsimile apparatus, or other such image forming apparatus including an image forming portion configured to form an image on a recording medium. It is possible to obtain the same effects by applying the first embodiment to the image reading apparatus provided to the image forming apparatus.

Second Embodiment

Now, a second embodiment will be described. In the second embodiment, the same components as those in the first embodiment are denoted by the same reference symbols, to thereby omit descriptions thereof. The image reading apparatus 200 according to the second embodiment is the same as that in the first embodiment, and hence a description thereof is omitted. A control system 450 in the second embodiment is different from the control system 250 in the first embodiment in that an AFE 402 is mounted to the image reading controller 310. Points different from those in the first embodiment are mainly described below.

Figure 14:
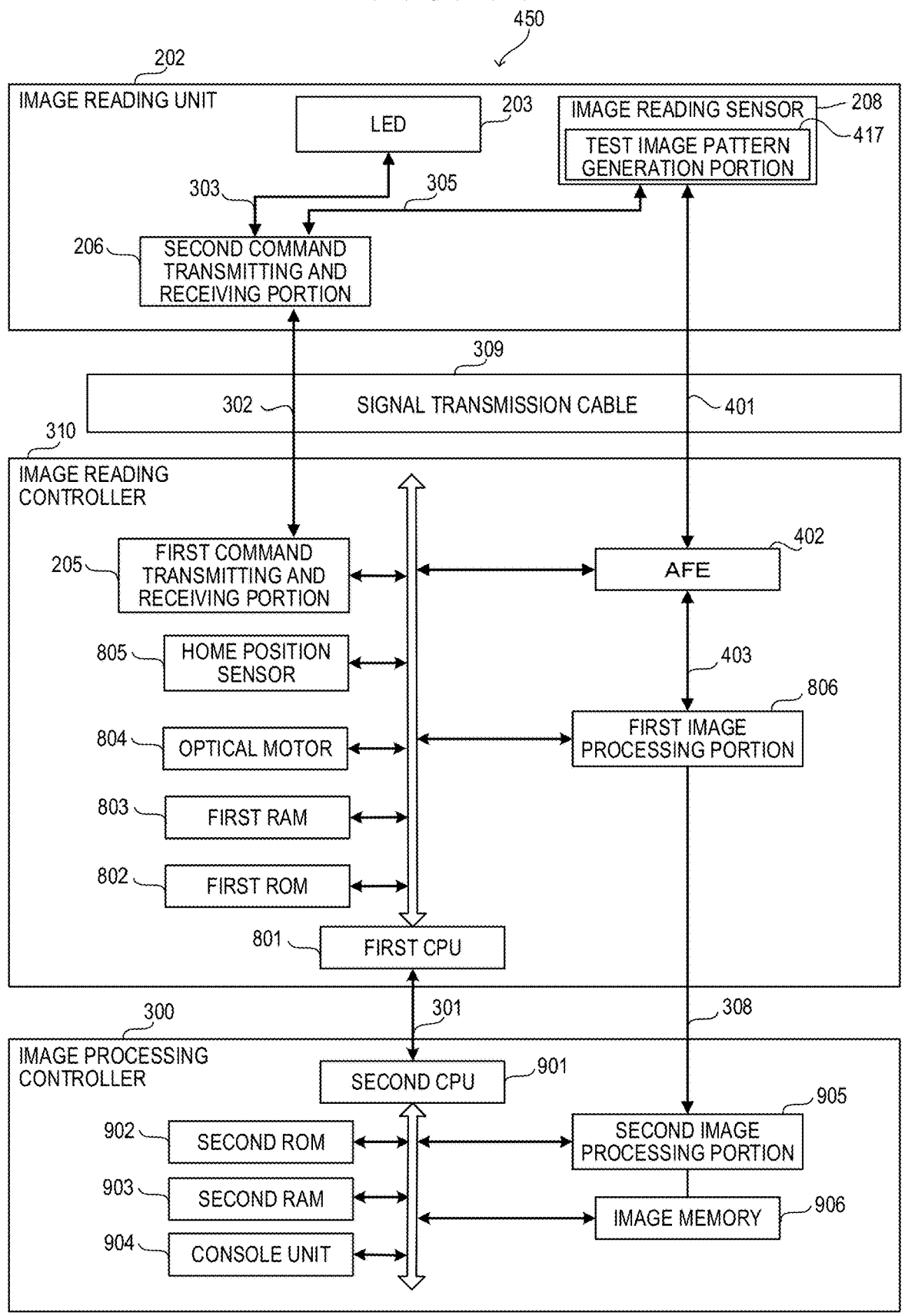
FIG. 14 is a block diagram of a control system of an image reading apparatus according to a second embodiment of the present invention.

FIG. 14 is a block diagram of the control system 450 of the image reading apparatus 200 according to the second embodiment. The image reading unit 202 includes the image reading sensor 208. The image reading sensor 208 in the second embodiment includes a test image pattern generation portion (image signal generation portion) 417 configured to generate an image signal based on the test image pattern (predetermined pattern). The AFE 402 is provided to the image reading controller 310. A first image communication portion 401 is a communication line configured to transmit an analog image signal output from the image reading sensor 208 to the AFE 402 of the image reading controller 310. The first image communication portion 401 is included in the signal transmission cable 309 configured to connect the image reading unit 202 and the image reading controller 310. The AFE 402 is an A/D converter configured to convert the analog image signal received from the image reading sensor 208 into a digital image signal. The AFE 402 transmits the digital image signal to the first image processing portion 806 through a second image communication portion 403. The rest of the structure of the control system 450 is the same as that of the control system 250 in the first embodiment, which is illustrated in FIG. 2, and hence a description thereof is omitted.

Figure 15A:
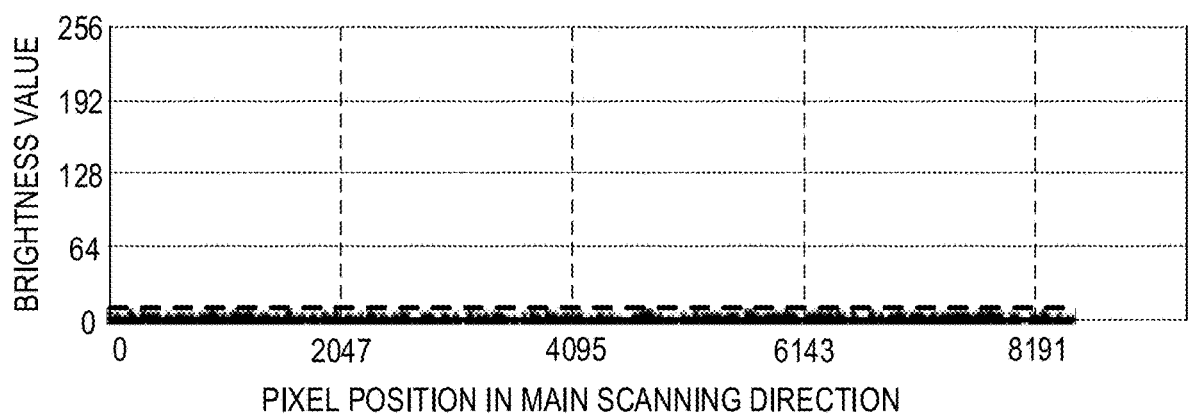
FIG. 15A, FIG. 15B, and FIG. 15C are diagrams for illustrating normal waveforms of a fixed data image output pattern in the second embodiment.
Figure 15B:
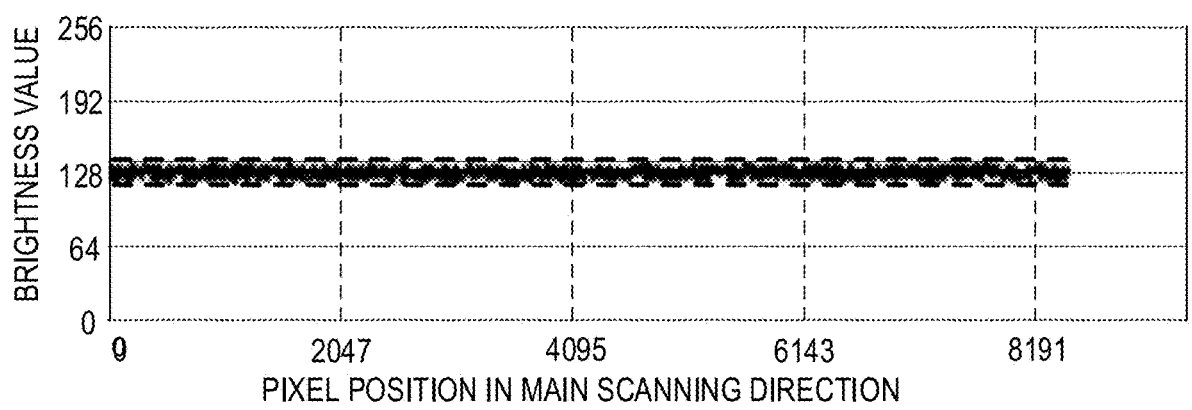
Figure 15C:
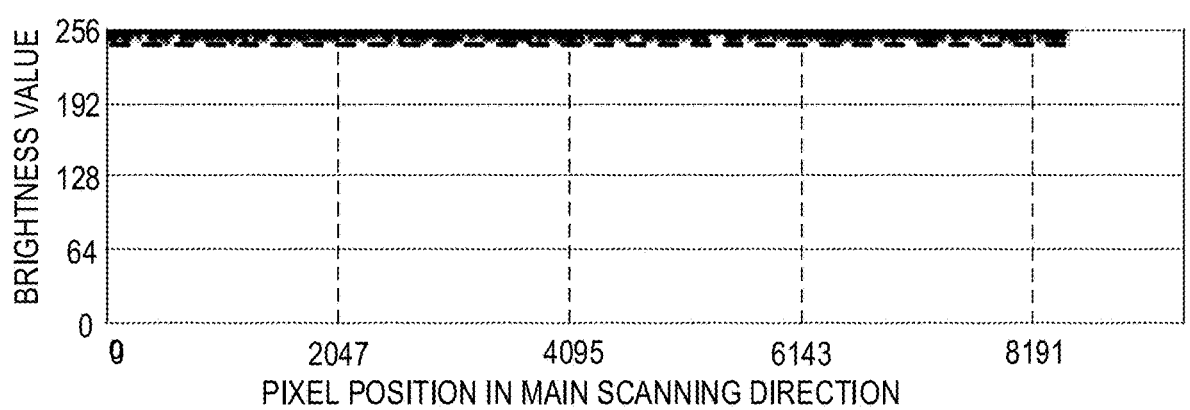

The test image pattern generation portion (analog image signal generation portion) 417 of the image reading sensor 208 can generate a plurality of types of test image patterns (a plurality of predetermined analog waveforms) set in advance. The test image pattern in the second embodiment is a fixed data image output pattern. FIG. 15A, FIG. 15B, and FIG. 15C are diagrams for illustrating normal waveforms of the fixed data image output pattern in the second embodiment. In FIG. 15A, FIG. 15B, and FIG. 15C, the solid line represents a normal waveform of the fixed data image output pattern, and the broken line represents an allowable range of a brightness value of the fixed data image output pattern. FIG. 15A is an illustration of a normal waveform of the fixed data image output pattern near a brightness value of 0, which is output from the image reading sensor 208. FIG. 15B is an illustration of a normal waveform of the fixed data image output pattern near a brightness value of 128, which is output from the image reading sensor 208. FIG. 15C is an illustration of a normal waveform of the fixed data image output pattern near a brightness value of 255, which is output from the image reading sensor 208.

A disconnection determination operation for the signal transmission cable 309, which is executed by the first CPU 801 in the second embodiment, is the same as that in the first embodiment, which is illustrated in FIG. 3, and hence a description thereof is omitted. In the second embodiment, for example, the test image pattern index of the fixed data image output pattern near the brightness value of 0, which is illustrated in FIG. 15A, is set to 0. The test image pattern index of the fixed data image output pattern near the brightness value of 128, which is illustrated in FIG. 15B, is set to 1. The test image pattern index of the fixed data image output pattern near the brightness value of 255, which is illustrated in FIG. 15C, is set to 2.

Figure 16A:
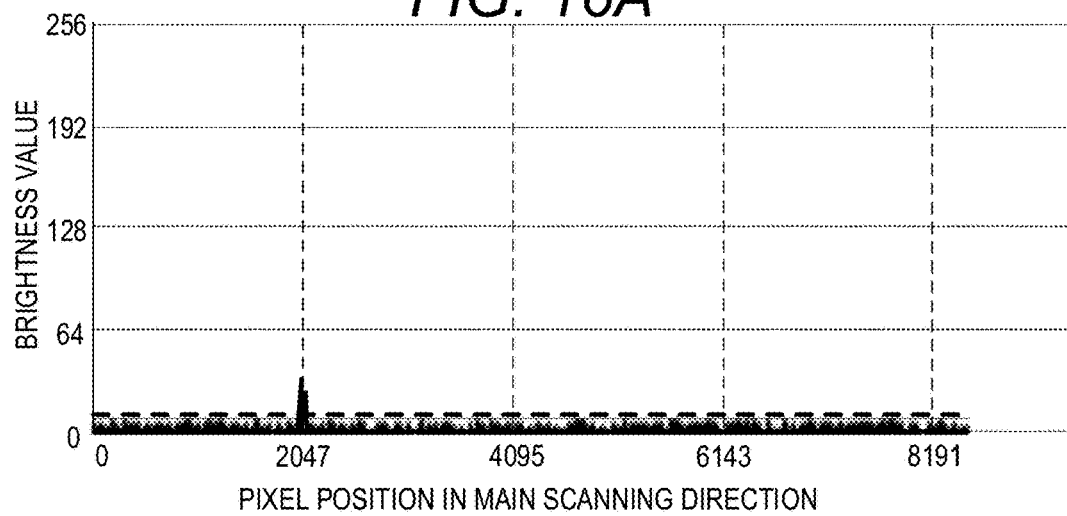
FIG. 16A, FIG. 16B, and FIG. 16C are diagrams for illustrating abnormal waveforms of the fixed data image output pattern in the second embodiment.
Figure 16B:
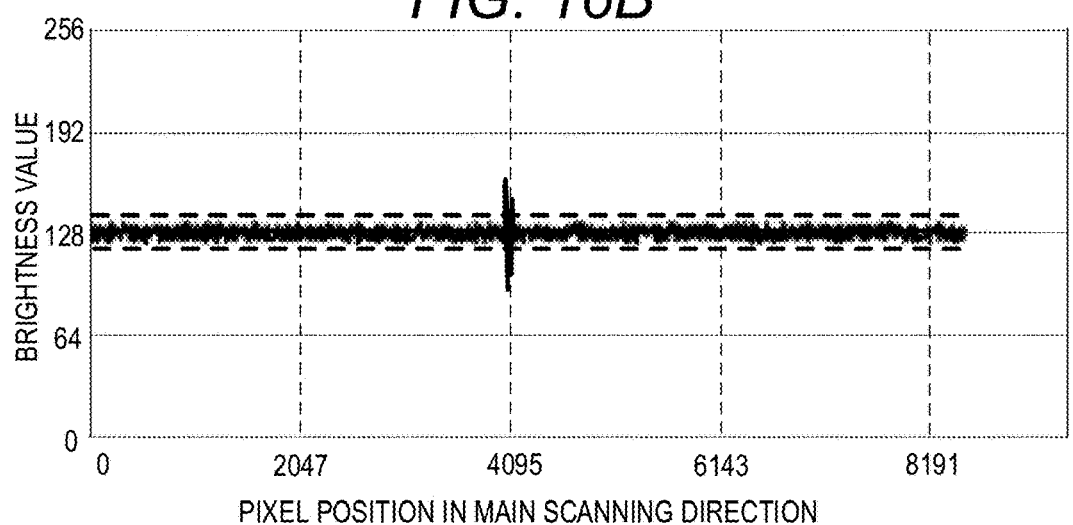
Figure 16C:
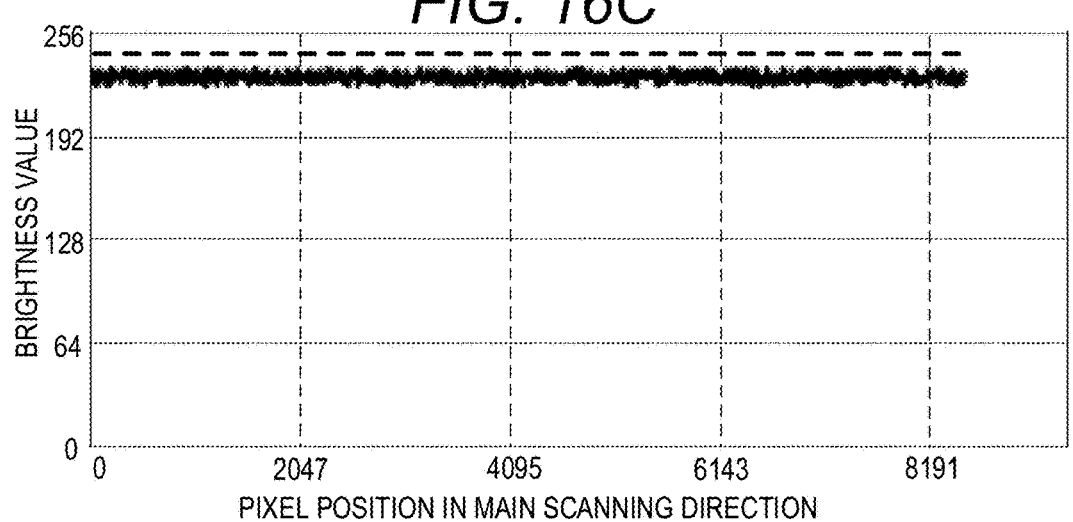

FIG. 16A, FIG. 16B, and FIG. 16C are diagrams for illustrating abnormal waveforms of the fixed data image output pattern in the second embodiment. In FIG. 16A, FIG. 16B, and FIG. 16C, the broken line represents an allowable range of a brightness value of the fixed data image output pattern. FIG. 16A is an illustration of an abnormal waveform of the fixed data image output pattern near a brightness value of 0, which is output from the image reading sensor 208. The allowable range (predetermined range) of the brightness value is, for example, a brightness value ranging from 0 to 10. A brightness value exceeding the allowable range is output at the 2,047th pixel in the main scanning direction. FIG. 16B is an illustration of an abnormal waveform of the fixed data image output pattern near the brightness value of 128 output from the image reading sensor 208. The allowable range (predetermined range) of the brightness value is, for example, a brightness value ranging from 118 to 138. A brightness value exceeding the allowable range is output at the 4,095th pixel in the main scanning direction. FIG. 16C is an illustration of an abnormal waveform of the fixed data image output pattern near the brightness value of 255 output from the image reading sensor 208. The allowable range (predetermined range) of the brightness value is, for example, a brightness value ranging from 245 to 255. Brightness values below the allowable range are output over all the pixel ranges in the main scanning direction. In particular, the abnormal waveform illustrated in FIG. 16C tends to appear when a voltage of a power line signal drops.

In the second embodiment, the brightness value (obtained pattern) of the image signal of the test image pattern, which has been output from the image reading sensor 208 including the test image pattern generation portion 417 and received by the first image processing portion 806, is included in the predetermined pattern. In the second embodiment, in the same manner as in the first embodiment, the first CPU 801 determines whether or not the obtained pattern is included in the predetermined pattern in Step S312 and Step S327 of FIG. 3. At this time, a noise component in the transmission line of the first image communication portion 401 is superimposed on the analog image signal transmitted through the first image communication portion 401 of the signal transmission cable 309. Therefore, when the brightness value of the obtained pattern falls within a predetermined range, the obtained pattern is determined to be included in the predetermined pattern. The predetermined range is, for example, a brightness value range of ±10 with respect to the brightness value output from the image reading sensor 208. The predetermined pattern is, for example, the range of the brightness value ranging from 0 to 10, the range of the brightness value ranging from 118 to 138, and the range of the brightness value ranging from 245 to 255 for the test image pattern indices of 0, 1, and 2, respectively.

According to the second embodiment, it is possible to provide the image reading apparatus 200 capable of detecting an abnormality in the signal transmission cable 309. In the second embodiment, it is possible to detect a disconnection in the signal transmission cable 309 even when the signal transmission cable 309 includes the first image communication portion 401 configured to transmit an analog image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-048051, filed Mar. 15, 2018, which is hereby incorporated by reference herein in its entirety.

What is claimed is:

1. An image reading apparatus, comprising:
an original table glass on which an original is placed;
an image reading unit, provided beneath the original table glass, configured to read an image of an original with movement of the image reading unit, and to output an image signal corresponding to the image of the original;
an image reading controller configured to control the image reading unit;
a flexible flat cable configured to connect the image reading unit and the image reading controller and configured to transmit the image signal output from the image reading unit to the image reading controller;
a drive portion configured to move the image reading unit in a case in which the image of the original is read by the image reading unit; and
a test signal generation portion provided in the image reading unit, the test signal generating portion being operable during a diagnosis mode to generate a test signal and to output the generated test signal to the image reading controller through the flexible flat cable,
wherein in the diagnosis mode presence or absence of an abnormality of the flexible flat cable is detected,
wherein the drive portion moves the image reading unit to a predetermined position in the diagnosis mode, the test signal generation portion continues to output the test signal from when the image reading unit starts moving until the image reading unit moves to the predetermined position, and the image reading controller is configured to detect whether there is the abnormality in the flexible flat cable based on the test signal output by the test signal generation portion.

2. The image reading apparatus according to claim 1, wherein the image reading controller is configured to compare a pattern of the test signal with a predetermined pattern, and to detect that there is the abnormality in the flexible flat cable when the pattern of the test signal does not include the predetermined pattern.

3. The image reading apparatus according to claim 2, wherein the predetermined pattern includes a plurality of test image patterns.

4. The image reading apparatus according to claim 1, wherein the image reading controller is configured to compare a pattern of the test signal with a predetermined pattern, and to detect that there is the abnormality in the flexible flat cable when the pattern of the test signal does not match the predetermined pattern.

5. The image reading apparatus according to claim 1, wherein the test signal generation portion is configured to generate a horizontal sync signal, and
wherein the image reading controller is configured to detect that there is the abnormality in the flexible flat cable when the image reading controller does not receive the horizontal sync signal within a predetermined time period from a start of outputting the test signal based on a predetermined pattern from the test signal generation portion.

6. The image reading apparatus according to claim 1, wherein the image reading controller is configured to detect whether there is the abnormality in the flexible flat cable during an abnormality diagnosis for identifying a replacement part, which has an abnormality, of the image reading apparatus.

7. The image reading apparatus according to claim 6, further comprising a console unit configured to allow a user to operate the image reading apparatus,
wherein the image reading controller is configured to detect whether there is the abnormality in the flexible flat cable in accordance with an instruction issued from the console unit after the replacement part of the image reading apparatus is replaced.

8. The image reading apparatus according to claim 1, wherein the image reading controller is configured to detect whether there is the abnormality in the flexible flat cable when the image reading apparatus is subjected to assembly inspection at a factory.

9. The image reading apparatus according to claim 1, wherein the image reading controller is configured to detect whether there is the abnormality in the flexible flat cable during an abnormality diagnosis of the image reading apparatus from a remote site.

10. The image reading apparatus according to claim 1, wherein the test signal generated by the test signal generation portion includes a digital image signal.

11. The image reading apparatus according to claim 10, wherein the image reading unit comprises:

an image reading sensor configured to emit light to the original, receive a reflected light from the original, and generate an analog image signal; and an analog-to-digital converter configured to convert the analog image signal into the digital image signal, and wherein the test signal generation portion is provided in the analog-to-digital converter.

12. The image reading apparatus according to claim 1, wherein the test signal generated by the test signal generation portion includes an analog image signal.

13. The image reading apparatus according to claim 12, wherein the image reading controller is configured to detect that there is the abnormality in the flexible flat cable when the analog image signal is not within a predetermined range of a predetermined pattern.

14. The image reading apparatus according to claim 12, wherein the image reading unit comprises an image reading sensor configured to emit light to the original, receive a reflected light from the original, and generate an analog image signal, and wherein the test signal generation portion is provided in the image reading sensor.

15. The image reading apparatus according to claim 1, wherein the predetermined position is a position in which a reading of the image of the original is completed.

16. The image reading apparatus according to claim 1, wherein a bending state of the flexible flat cable is changed in accordance with a position of the image reading unit.

17. The image reading apparatus according to claim 1, wherein a position in which a most stress is applied to the flexible flat cable is changed in accordance with a position of the image reading unit.

* * * * *